(12) United States Patent
Caldera

(10) Patent No.: US 12,207,717 B2
(45) Date of Patent: Jan. 28, 2025

(54) BAG FOR TWO

(71) Applicant: Raffaella Caldera, Cerro Maggiore (IT)

(72) Inventor: Raffaella Caldera, Cerro Maggiore (IT)

( * ) Notice: Subject to any disclaimer, the term of this patent is extended or adjusted under 35 U.S.C. 154(b) by 18 days.

(21) Appl. No.: 18/264,722

(22) PCT Filed: Feb. 7, 2022

(86) PCT No.: PCT/IT2022/050020
§ 371 (c)(1),
(2) Date: Aug. 8, 2023

(87) PCT Pub. No.: WO2022/195634
PCT Pub. Date: Sep. 22, 2022

(65) Prior Publication Data
US 2024/0115022 A1     Apr. 11, 2024

(30) Foreign Application Priority Data
Mar. 17, 2021  (IT) .................. 102021000006431

(51) Int. Cl.
*A45C 13/02* (2006.01)
*A45C 13/10* (2006.01)
*A45C 13/30* (2006.01)

(52) U.S. Cl.
CPC ............ *A45C 13/103* (2013.01); *A45C 13/02* (2013.01); *A45C 13/30* (2013.01); *A45C 2013/1015* (2013.01)

(58) Field of Classification Search
CPC ....... A45C 13/103; A45C 13/02; A45C 13/30; A45C 2013/1015

USPC ................................................. 150/107, 111
See application file for complete search history.

(56) References Cited

U.S. PATENT DOCUMENTS

| | | | |
|---|---|---|---|
| 6,213,268 B1 | 4/2001 | Dancyger | |
| 6,237,660 B1 | 5/2001 | Giardino | |
| 9,375,061 B2 | 6/2016 | Mosee | |
| 2015/0265020 A1* | 9/2015 | McCue | ............... A45C 13/103 206/216 |

FOREIGN PATENT DOCUMENTS

JP      3154180 U      9/2009

OTHER PUBLICATIONS

Anonymous, "Bag for Two", Retrieved from the Internet: URL: https://www.facebook.com/CARABORSE/photos/a.0112181923616145/263011435199859/, Mar. 5, 2021, 1 page.
International Search Report for PCT/IT2022/050020 mailed May 27, 2022, 5 pages.
Written Opinion of the ISA for PCT/IT2022/050020 mailed May 27, 2022, 7 pages.

* cited by examiner

*Primary Examiner* — Sue A Weaver
(74) *Attorney, Agent, or Firm* — NIXON & VANDERHYE

(57) ABSTRACT

The bag for two is a design bag, which achieves the possibility of carrying, with only one bag, personal objects in a safe and separate space, at the same time having a free and different space adaptable for carrying anything according to the needs, including, last but not least, a pet. A series of technical measures guarantee the maximum comfort, hygiene and variety of use thereof in all situations, to be adapted to all means of transport.

8 Claims, 5 Drawing Sheets

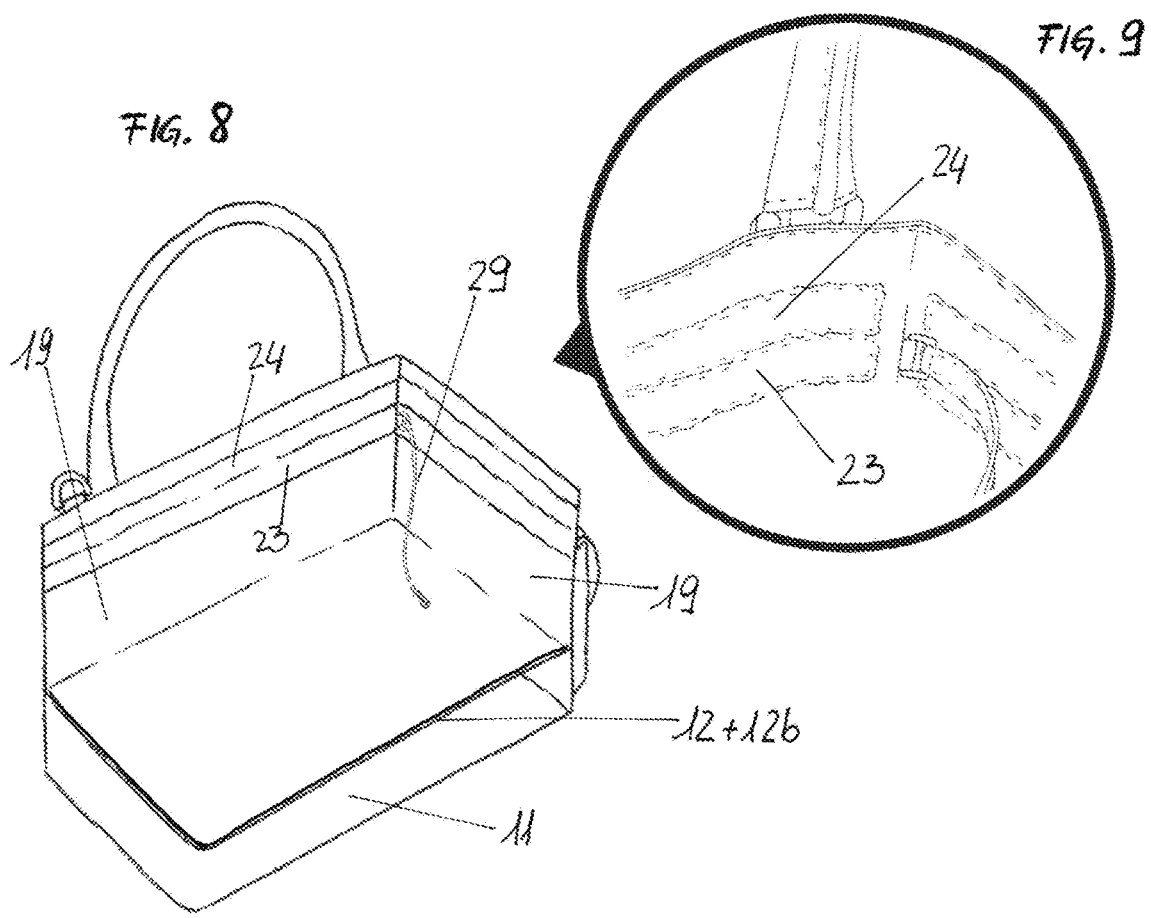
FIG. 8
FIG. 9
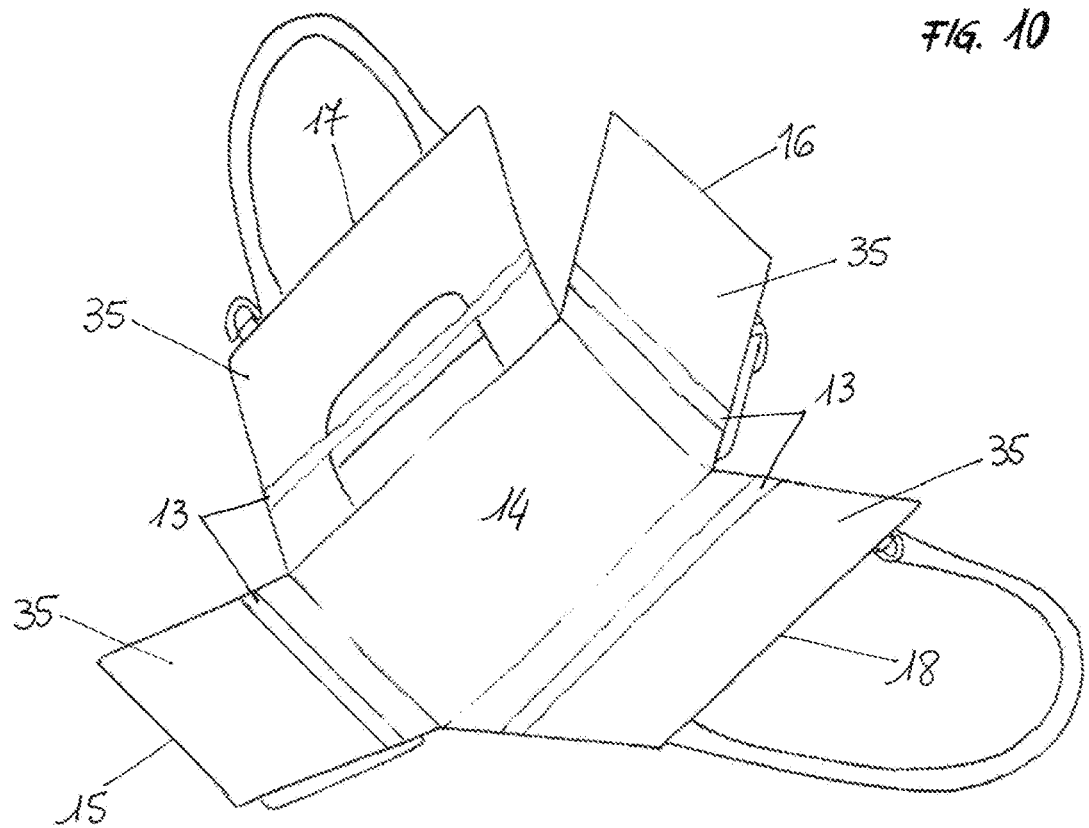
FIG. 10

BAG FOR TWO

CROSS-REFERENCE TO RELATED APPLICATIONS

This application is the US national stage of PCT/IT2022/050020, filed Feb. 7, 2022 and designating the United States, which claims the priority of IT 102021000006431, filed Mar. 17, 2021. The entire contents of each foregoing application are incorporated herein by reference.

FIELD OF APPLICATION OF THE INVENTION

The present find relates to a bag. Typically it is a lady's bag, however, the use thereof by all sexes and genres is not excluded.

Overview of the Prior Art

Bags are normally used for carrying personal objects. The existing different types tend to meet the needs marginally and sectorially, based on the environment or purpose for which they are suggested. Leisure bags, work bags, bags designed for trips by plane, by train or by car and bags for carrying pets.

In the case of more spacious bags, they are normally provided with a larger compartment and smaller pockets for storing small objects. In the case of shopping, the new purchases get mixed up with the personal objects creating confusion and overfilling. Furthermore, bags are often used for temporarily storing clothes, which may be momentarily taken off (in this case, jumpers or jackets) if the environment heats up and the risk of dropping personal objects is frequent when it is necessary to remove clothing from the bag and put it back on again.

As is well-known, there are also bags which are adapted to exclusively carrying pets. They are pet carriers or bags specifically dedicated for this purpose by model and shape. Therefore, these bags for animals must be added to the normal bag used for carrying objects if a person wishes to carry his/her small pet. Typically, despite being able to be closed by a zip or by buttons, the bags often stay open leaving wallets or personal objects at the mercy of criminals and delinquents.

Finally, if the bag is used for work, technical instruments, such as notepads, organizers, tablets and pens are hard to find quickly without turning the other objects in the bag upside down.

Therefore, the known solutions are inadequate from the following points of view:
  the organization of the space and objects contained in the bag
  the safety and easy retrieval of the objects kept in the bag in a specific and separate place
  the need to carry a pet in only one bag, which reflects the taste and style of the person wearing it and which has, at the same time, a separate space for personal objects
  versatility and adaptability of the bag to all means of transport

Objects of the Invention

In this context, the technical task underlying the present find is to suggest a "bag for two", which overcomes all these listed needs, which are changeable and often concomitant in daily life, without needing to add bags, simplifying the management of each need.

SUMMARY OF THE INVENTION

The technical task and the specified objects are achieved by a "bag for two" comprising the technical features set out in one or more of the appended claims.

BRIEF DESCRIPTION OF THE DRAWINGS

Further features and advantages of the present find will become more apparent from the indicative and thus non-limiting description of a preferred, but not exclusive embodiment of a bag, as shown in the accompanying drawings, in which:

FIG. 10 perspective view of the bag in a fully open position, previously lined with the first lining, but before positioning the bottom and the second lining, which determine the creation of the subfloor integrated into the bag

DETAILED DESCRIPTION OF PREFERRED EMBODIMENTS OF THE INVENTION

Figure 1:
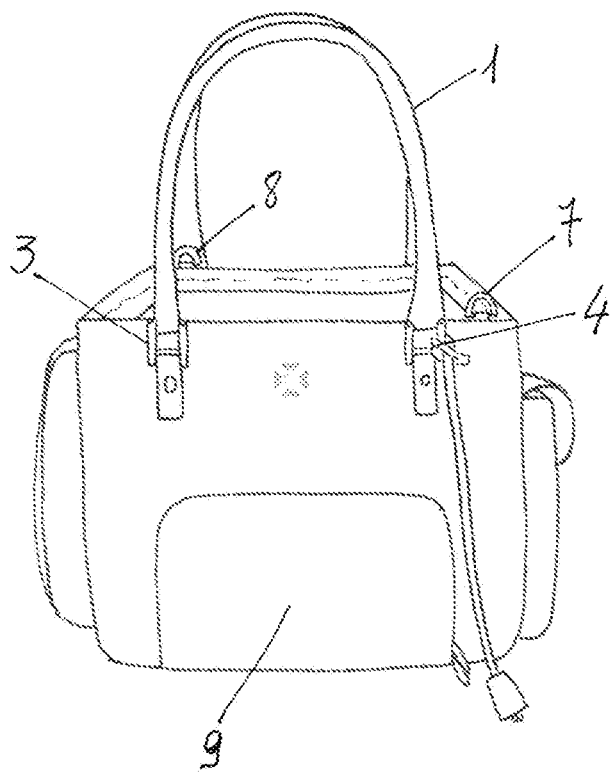
FIG. 1 is a front view of the bag

With reference to the accompanying figures "the bag for two" is described according to the invention, and usable for the combined, but separate, transport of objects and animals in all environments and with all means of transport. In FIG. 1 in the middle of the bag, at the bottom, we observe an opening (9) closed by a zip fastener.

Figure 7:

In FIG. 7 highlights the central pocket (9) FIG. 1, opened: by means of a zip closing provided with a two-way zipper, which allows the opening to be opened and closed with only one hand, an edge (10) is opened, allowing access to a particularly spacious compartment (11) FIG. 8, which takes up the whole base surface (14) FIG. 10 of the bag, remaining separate from the rest like a sort of subfloor (11) (FIG. 8), which is adapted to separately protect the personal objects.

The double bottom integrated into the bag (11) (FIG. 8) is a completely new and innovative element, as well as original. The double bottom is not detached or added, but it is an element, which is created together with the structure of the bag (FIG. 10). In particular (FIG. 10) the bottom of the bag (14) is sewn together with the left side (15) and right side (16). Then, the back (18) is also added to the bottom (14), and the front part of the bag (17), again secured by sewing. All these elements (15-16-17-18) are covered by an inner lining (35) FIG. 10 onto which a male hook and loop fastener strip is sewn at a height of approximately 10.5 cm from the bottom. The second bottom (12), which becomes the ceiling of the subfloor, is sewn with the third bottom (12b) FIG. 8, which will be the bottom of the multifunctional space. The double bottom (12+12b) is necessary because each compartment of the bag is perfectly finished and the "reverse" side of both bottoms (12 and 12b) stays between the two bottoms. These two bottoms are sewn together with a second lining (19) FIG. 8 to be secured to the side walls. On the inner side of this second lining, female hook and loop fastener strips are sewn on all sides, again at a height of 10.5 cm from the bottom, and will be hooked to the male hook and loop fastener strips (13) sewn on the first inner lining of the bag (35) FIG. 10.

The compartment, which is obtained (11), is integrated, but easily and conveniently accessible from the outside by means of an opening (9) FIG. 1, which is closed by a two-way zipper.

Figure 3:
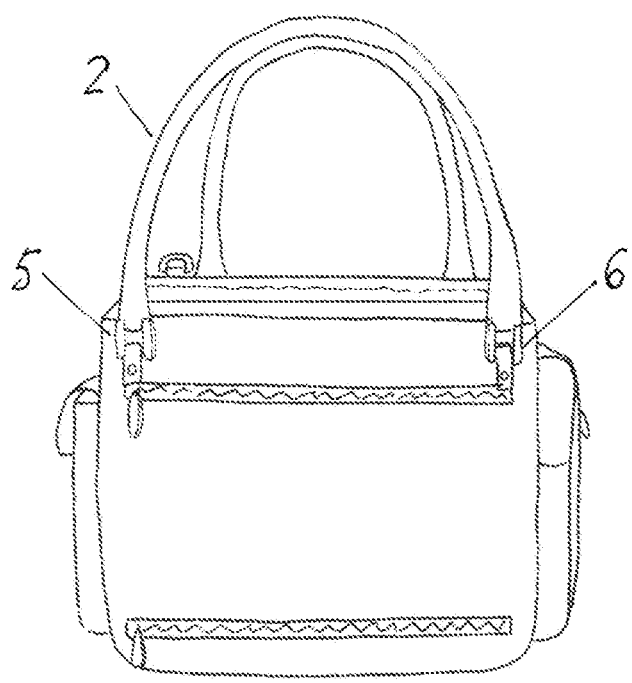
FIG. 3 shows the rear side of the bag

By comparing FIG. 1 and FIG. 3 it is apparent that the front handle (1) has securing points (3) and (4) with a reduced center-to-center distance with respect to the other handle (2) present in the rear part of the bag—FIG. 3—wherein the securing points (5) and (6) are further spaced apart. This greater distancing between the connection points of the rear handle enables the rear handle and the front handle to be used separately, preventing the bag from tipping over. By using only one handle it is possible to access the multifunctional compartment (22) and the contents therein more easily: the bag stays in the vertical position and grips to the body without the risk of it tipping over, even if only the rear handle is used.

Figure 6:
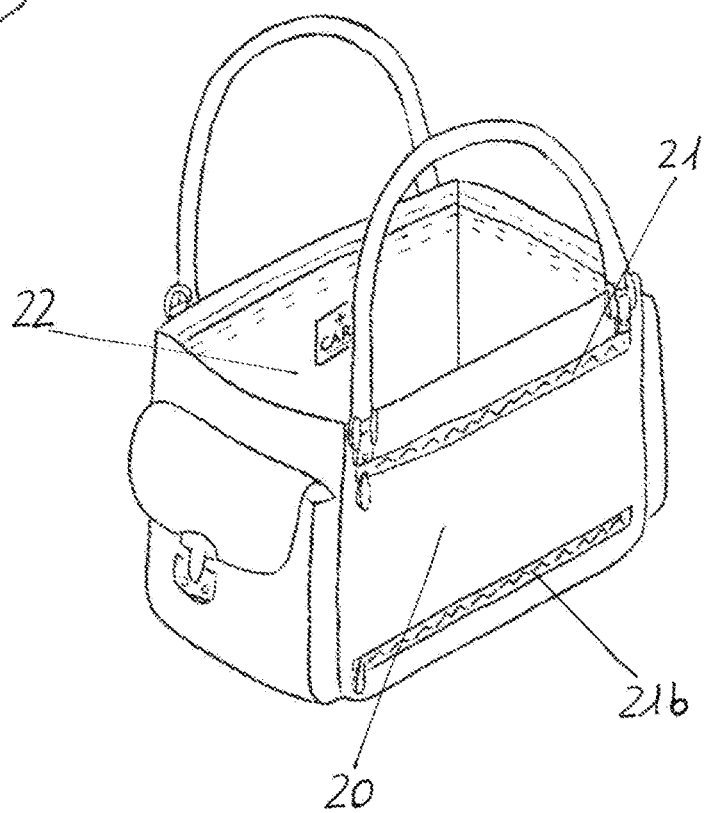

Furthermore, another pocket is present (20) FIG. 6, which serves a dual purpose. It is closed by a zip fastener as in the figure both at the top (21) and at the bottom (21b). It is a particularly spacious pocket with generous dimensions to allow sheets or documents to be carried without being bent, or a loop is created by opening both zip fasteners, into which the trolley handle is inserted to allow the bag to be anchored to the trolley in "travel mode".

Figure 2:
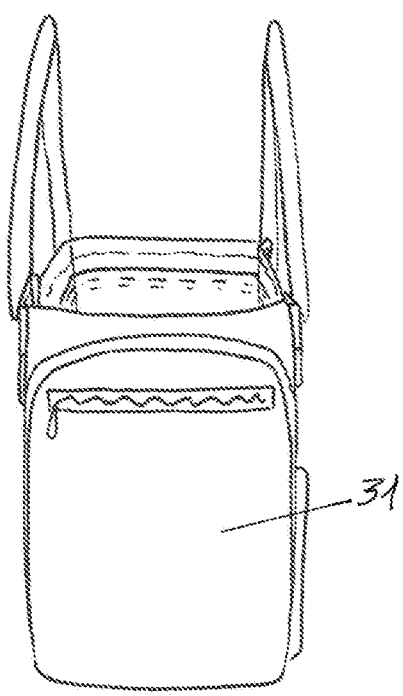
FIG. 2 shows the left side of the bag
Figure 4:
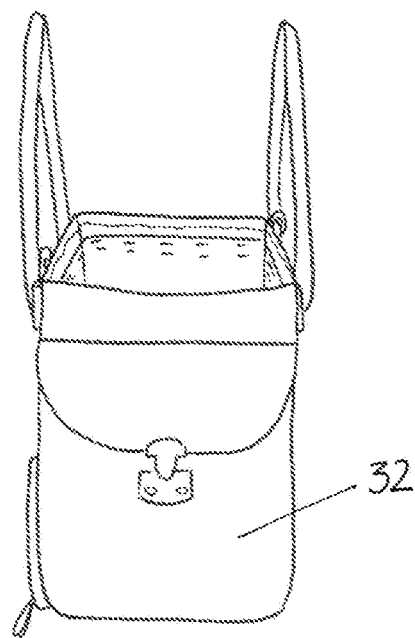
FIG. 4 shows the right side of the bag

In FIGS. 2 and 4 it is possible to observe the desired difference in shape, size and closing of the two side pockets: this is to facilitate the identification of the contents in the two pockets, by the user, without necessarily opening them to locate what he/she is looking for.

Figure 11:
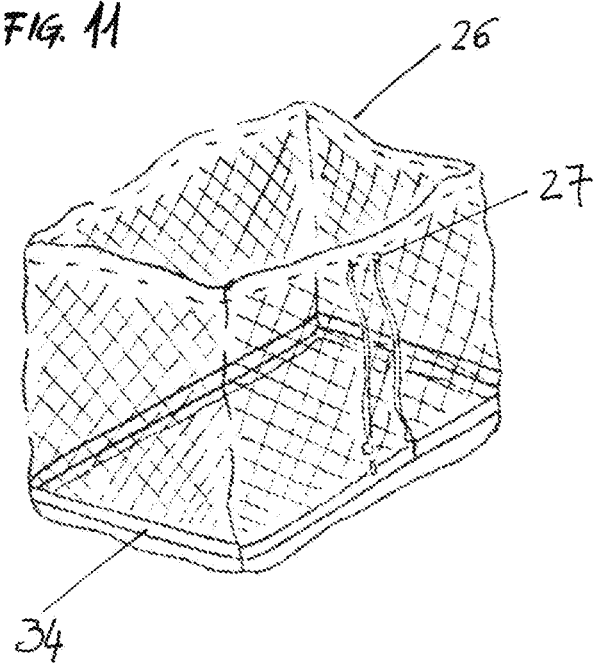
FIG. 11 shows the accessory made of net with the top closing with a drawstring or zip fastener to be hooked to the upper hook and loop fastener strip of the multifunctional space.

FIG. 6 and FIG. 8 show a view from above of the "bag for two", highlighting the more voluminous and multifunctional space (22). The space is fully lined by the second inner lining (19) FIG. 8, which has been joined, on one side, to the first lining of the structure (35) FIG. 10 and, onto the other side, two hook and loop fastener strips, or two divisible zip fastener parts (23 and 24), have been sewn, one on top of the other FIG. 9 along the whole inner perimeter of the main body. It is possible to secure an open interchangeable cover (25) to the lower Velcro/zip fastener line (23) FIG. 5, while a net element (26) can be hooked to the upper hook and loop fastener strip/zip fastener line (24) FIG. 11 by means of the hook and loop fastener strip/zip fastener strip sewn to the bottom (34) FIG. 11, which is closed at the end by a drawstring (27) or zip fastener, which allows the bag to carry the pet in environments where the pet needs to be closed inside the bag. The final effect of the closed version is visible in FIG. 12.

Figure 5:
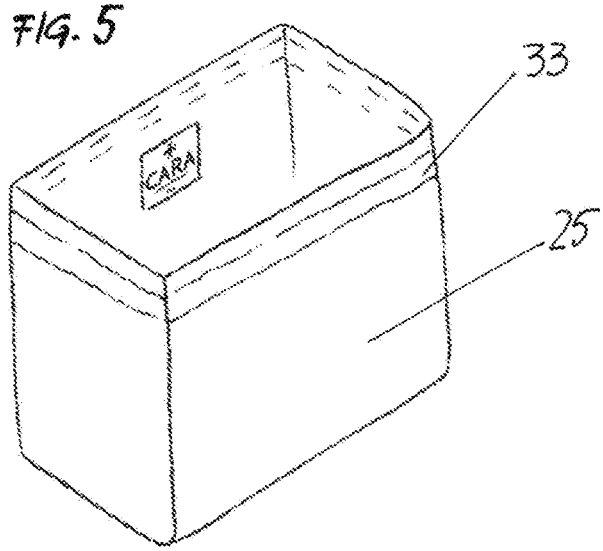
FIG. 5 shows the open removable inner sac
FIG. 6 view from above of the bag rear side
FIG. 7 view from above of the bag with the opening for accessing the open subfloor compartment
FIG. 8 cross-section of the multifunctional space, highlighting the subfloor and multifunctional space
FIG. 9 detail of the anchoring hook and loop fastener strips of the removable sac positioned on the walls of the second inner lining.
Figure 13:
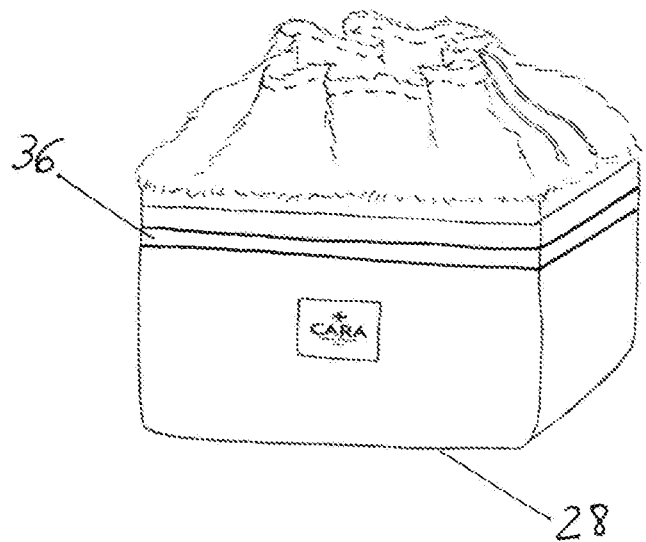
FIG. 13 shows the removable inner sac closed version
Figure 12:
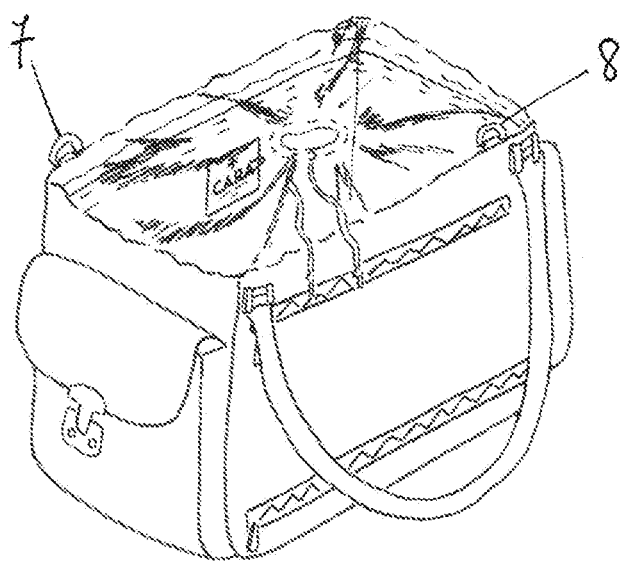
FIG. 12 shows the bag with the upper net applied. The multifunctional space is in closed mode to allow the animal to be carried on trains or planes

In the multifunctional space (22) onto the walls of which two hook and loop fastener strips or two divisible zip fastener parts (23 and 24) (FIG. 9) are sewn, one on top of the other, it is therefore possible to insert:

a) an open removable sac (25) FIG. 5 with effect visible in FIG. 7 b) an open sac (25) in combination with the net cover (26) with effect visible in FIG. 12 c) a sac closed at the top by a drawstring or by a zip fastener (28) FIG. 13, closing the multifunctional space, which has the same effect as in FIG. 12

Figure 14:
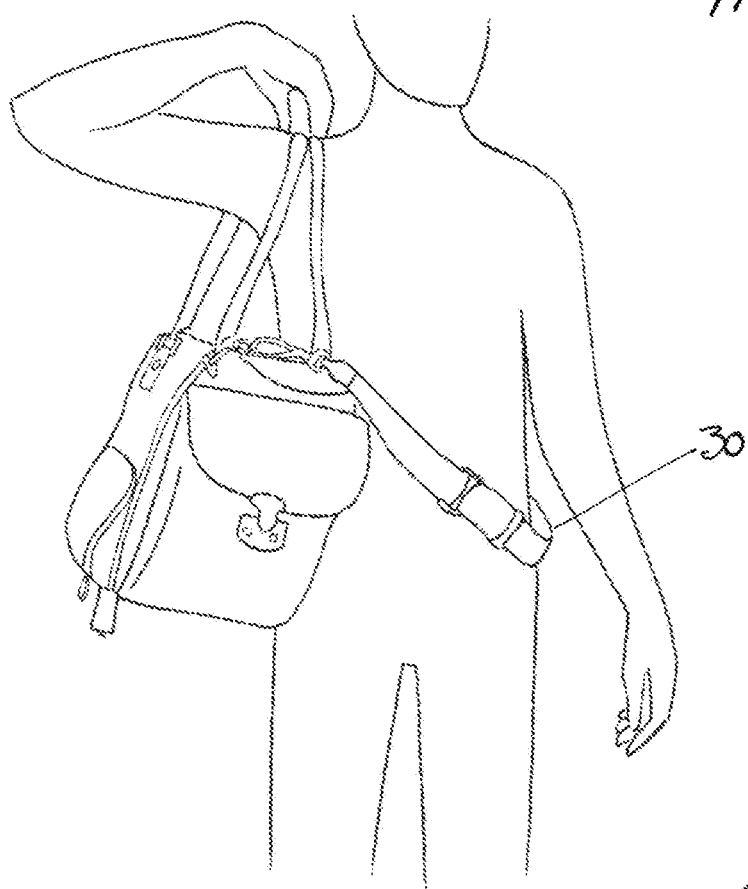
FIG. 14 shows an alternative theft-proof version of use of the shoulder strap
Figure 15:
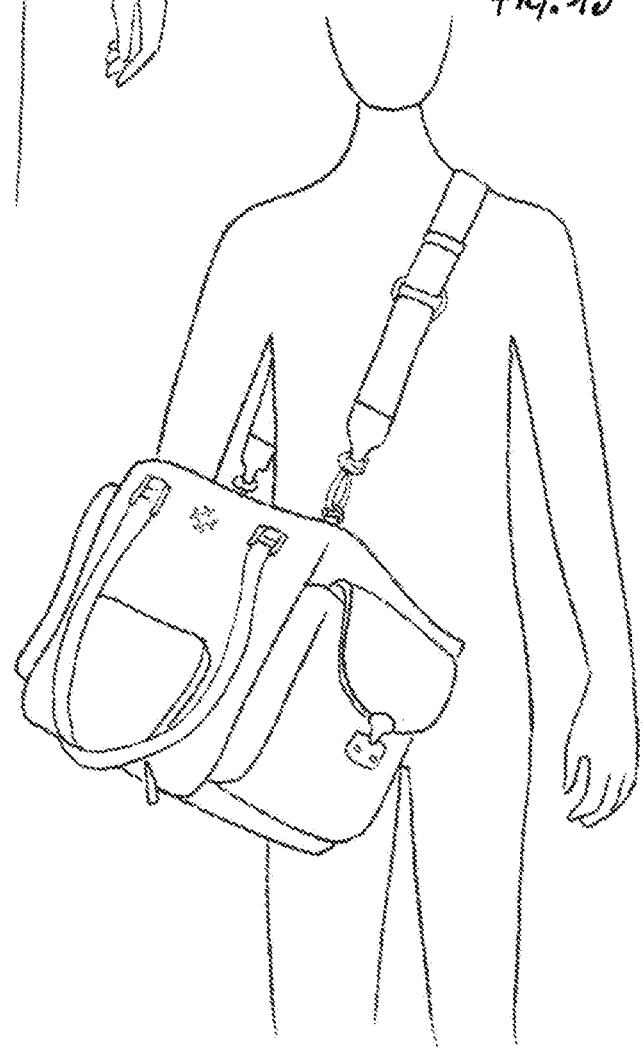
FIG. 15 shows the classical use of the shoulder strap as an alternative to the handles.

This easily replaceable sac (open (25) FIG. 5 or closed (28) FIG. 13) satisfies the need to change the "container" according to the season (it is possible to insert an inner made of leather, fur, cashmere, a waterproof or technical material), it is possible to change the color of the inner to match it with clothing, or the inner can be changed to carry one's pet. There is also a safety cord and a clasp (29) FIG. 8 with a dual purpose: it can be hooked to the animal's collar, if present, or it can be used to secure keys in a privileged position. If the safety cord is not used, it can be hidden by positioning it between the lining (19) and the interchangeable sac (25 or 28). These interchangeable inner sacs can be of two types and made of different materials. The open sac type comprises the possibility of being combined with the net accessory (26) for closing the animal, while the closable interchangeable sac (28) FIG. 13 allows the multitasking space (22) to be closed. The adjustable shoulder strap (30) is anchored to the securing points (7) and (8) FIG. 12 and completes the find. The connection points of the shoulder strap are opposite and in crossed points so as not to hinder the opening of the side pockets and allow the animal to have its head facing on the short side of the bag. The shoulder strap is not only an alternative way, to the handles, of carrying the bag (FIG. 15) but, being adjustable, it can also be an additional element for securing the bag to the body when it is on the shoulder. Simply pass the shoulder strap over the head and make it slide down to the waist to prevent muggings FIG. 14.

The present find, together with all the elements composing it, brings important advantages, and in particular:

- having a single bag for business, leisure, trips and carrying pets
- always having a free and sizable space available for storing what is necessary without becoming mixed up with personal objects, which form the primary and fixed contents of the bag
- having a safe, closed space for the most important and valuable objects
- having a bag, which satisfies the needs of safety and hygiene as the inner covering can be replaced and/or washed
- having a bag, which adapts, every day, to different looks and to the different seasons of the year, simply by replacing the covering of the most visible and main multipurpose space of the bag.
- having an elegant and refined bag, adapted for any environment, which allows pets to be carried without having to use extra bags, which are often unsightly or unsuitable for more formal environments
- using the same bag in different environments and on different means of transport, both alone and with pets.

The invention, thus conceived and manufactured, is susceptible to numerous modifications and variations, all comprised within the underlying scope of the inventive concept.

Furthermore, all details can be replaced by technically equivalent elements. Basically, any materials can be used, as well as any sizes, according to the needs, without departing from the protective scope of the present invention as defined by the following claims.

The invention claimed is:

1. A bag comprising:
   a main body including:
      a bottom (14);
      a front wall (17);
      a rear wall (18);
      a pair of side walls (15, 16) each of which is provided with an external pocket (31, 32),
   the bottom (14), the front wall (17), the rear wall (18) and the pair of side walls (15, 16) defining a bag structure with a top opening;
   a first lining (35) inside the bag structure and covering, inside the bag structure, the front wall (17), the rear wall (18) and the pair of the side walls (15, 16);
   a second lining (19) covering, inside the bag structure, the front wall (17), the rear wall (18) and the pair of the side walls (15, 16),
   the second lining (19) having, at a side thereof which is visible inside the bag structure, a zip fastener (24) sewn at approximately 2 cm from the top opening and along the front wall (17), the rear wall (18) and the pair of side walls (15, 16);
   a bottom wall (12, 12b) sewn to the second lining (19) thereby creating a compartment (11) interposed between the bottom (14) and the bottom wall (12, 12b);
   an opening (9) in the front wall (17) for accessing the compartment (11), the opening (9) being closed by a flap (10) secured to the front wall (17), at the compartment (11), by means of a zip fastener along three quarters of the perimeter of the flap (10) and sewn to the bottom (14) for the last quarter of the perimeter of the flap (10);
   a removable inner sac (25, 28) further lining the main body;
   a pair of handles (1, 2) secured to the front wall (17) and to the rear wall (18), respectively;
   a safety strap (29) secured, in the upper part of the main body, in a corner position between the rear wall (18) and one of the side walls (15, 16);
   two ring buckles (7, 8) secured to an upper edge of the front wall (17) and the rear wall (18), respectively, in an opposite and crossed position, to which an adjustable shoulder strap (30) is coupled by means of clasps;
   a pocket (20) on the rear wall (18) delimited and defined by a zip fastener (21), which closes the pocket (20) at the top,
said bag being characterized in that:
   the first lining (35) has a hook and loop strip (13) sewn, at approximately 10.5 cm from the bottom (14), over the whole perimeter;
   the second lining (19) overlaps the first lining (35) and is attached to the hook and loop strip (13) of the first lining (35) by means of a hook and loop strip sewn to the second lining (19), over the whole perimeter, at approximately 10.5 cm from the bottom (14), at one side of the second lining (19) facing the first lining (35),
   the second lining (19) having, at the side thereof which is visible inside the bag structure, a hook and loop fastener or a zip fastener (23) sewn at approximately 3.5 cm from the top opening and along the front wall (17), the rear wall (18) and the pair of side walls (15, 16),
   the second lining (19) being able to have, at the side thereof which is visible inside the bag structure, as an alternative to the zip fastener (24) sewn at approximately 2 cm from the top opening, a hook and loop fastener sewn at approximately 2 cm from the top opening and along the front wall (17), the rear wall (18) and the pair of side walls (15, 16);
   said bottom wall is a double bottom wall (12, 12b);
   the inner sac (25, 28) is secured, by means of a hook and loop strip (33, 36) or a zip fastener, to the hook and loop strip or to the zip fastener (23), sewn to the second lining (19) at approximately 3.5 cm from the top opening;
   the pocket (20) on the rear wall (18) is also delimited and defined by a zip fastener (21b), which closes the pocket (20) at the bottom.

2. A bag according to claim 1, characterized in that it comprises a net (26) shaped as an open sac at the bottom and closed at the top by a drawstring (27) or a zip fastener,
   the net (26) being attachable, by means of a hook and loop strip or a zip fastener (34), to the hook and loop strip or the zip fastener (24) sewn to the second lining (19) at approximately 2 cm from the top opening.

3. A bag according to claim 1, characterized in that the sac (25, 28) is open at the top or closed at the top by a drawstring or a zip fastener.

4. A bag according to claim 1, characterized in that the handle (2) secured to the rear wall (18) is secured to the latter at two securing points (5, 6), which are further spaced apart than two securing points (3, 4) at which the handle (1) secured to the front wall (17) is secured to the latter.

5. A bag according to claim 1, characterized in that the two external pockets (31, 32) secured to the pair of side walls (15, 16), respectively, are different in shape, capacity, size and closing devices.

6. A bag according to claim 1, characterized in that the shoulder strap (30) is made of metals and precious stones or leather.

7. A bag according to claim 1, characterized in that the safety strap (29) is secured to a clasp at one end thereof and firmly sewn to the second lining (19) at another end thereof so that the safety strap (29) can stay hidden between the second lining (19) and the sac (25, 28) when not in use.

8. A bag according to claim 1, characterized in that the two zip fasteners (21, 21b) of the pocket (20) on the rear wall (18) are opposite to each other so that when the two zip fasteners (21, 21b) of the pocket (20) on the rear wall (18) are fully open, the pocket (20) on the rear wall (18) becomes a loop.

* * * * *